(12) United States Patent
Klipp et al.

(10) Patent No.: US 8,476,368 B2
(45) Date of Patent: Jul. 2, 2013

(54) LOW-K DIELECTRICS OBTAINABLE BY TWIN POLYMERIZATION

(75) Inventors: Andreas Klipp, Lambsheim (DE); Arno Lange, Bad Duerkheim (DE); Hans-Joachim Haehnle, Neustadt (DE)

(73) Assignee: BASF SE, Ludwigshafen (DE)

( * ) Notice: Subject to any disclaimer, the term of this patent is extended or adjusted under 35 U.S.C. 154(b) by 211 days.

(21) Appl. No.: 12/989,665

(22) PCT Filed: Apr. 28, 2009

(86) PCT No.: PCT/EP2009/055092
§ 371 (c)(1),
(2), (4) Date: Oct. 26, 2010

(87) PCT Pub. No.: WO2009/133082
PCT Pub. Date: Nov. 5, 2009

(65) Prior Publication Data
US 2011/0046314 A1 Feb. 24, 2011

(30) Foreign Application Priority Data

Apr. 28, 2008 (EP) .................................. 08155304

(51) Int. Cl.
*C08G 73/02* (2006.01)

(52) U.S. Cl.
USPC ........... 525/185; 525/474; 525/479; 526/270; 526/279; 556/483; 556/489

(58) Field of Classification Search
USPC ... 525/185, 479, 474; 526/270, 279; 556/483, 556/489
See application file for complete search history.

(56) References Cited

U.S. PATENT DOCUMENTS

| 4,172,806 A | 10/1979 | Vincent |
| 6,410,149 B1 | 6/2002 | Hendricks et al. |
| 7,148,263 B2 | 12/2006 | Li et al. |
| 2005/0127814 A1* | 6/2005 | Deguchi et al. ............... 313/495 |

FOREIGN PATENT DOCUMENTS

| DE | 10 2007 063 284 | 7/2009 |
| GB | 2 093 855 | 9/1982 |

OTHER PUBLICATIONS

U.S. Appl. No. 13/265,647, filed Oct. 21, 2011, Klipp.
U.S. Appl. No. 13/319,187, filed Nov. 7, 2011, Klipp.
U.S. Appl. No. 13/380,071, filed Dec. 22, 2011, Mellies, et al.
U.S. Appl. No. 13/145,257, filed Jul. 19, 2011, Klipp, et al.
International Search Report issued Jul. 22, 2009 in PCT/EP09/055092 filed Apr. 28, 2009.
Grund, S. et al. "Zwillingspolymerisation: ein Weg Zur Synthese Von Nanokompositen", Angew. Chem., vol. 119, pp. 636-640, XP002536734 (Dec. 7, 2006) (with English translation).
M. Van Bavel et al., "Low-K Dielectrics: Spin-On or CVD?", Future Fab International , Issue 17, pp. 95-98.
Reidy, R. F. , "Process Gases, Chemicals and Materials/Can Spin-On or CVD Porous Low-K Films Meet Future Integration Needs?", Future Fab International , issue 23, Section 6, pp. 95-98.
Ramsey, B. et al., "A Comparison of Modified Cndo/2 Calculations and the Photoelectron, Nmr and UV Spectroscopic Properties of Boron-Substituted Monophenylboranes", Journal of Organometallic Chemistry, vol. 141 pp. 257-273, (1977).
Wrackmeyer, B. et al., "Reactivity of Bicyclic N-Pyrrolylboranes-", Journal of Organometallic Chemistry, vol. 545-546, pp. 297-308, (1997).
Coie, T.E. et al., "Migration of 1-Alkenyl Groups From Zirconium to Boron Compounds", Organometallics, vol. 10, pp. 3777-3781, (1991).
Brown, H. C. et al., "Molecular Addition Compounds. 8, $^{13}$C and $^{11}$B NMR Examination of B-Substituted Derivatives of 9-Borabicyclo [3.3.1]Nonane and Their Pyridine Complexes", J. Org. Chem., vol. 45, pp. 846-849, (1980).
Midland, M. M. et al., "Chiral Trialkylborane Reducing Agents. Preparation of 1-Deuterio Primary Alcohols of High Enantiomeric Purity", Journal of the American Chemical Society, vol. 101:9, pp. 2352-2355, (Apr. 25, 1979).
U.S. Appl. No. 12/810,765, filed Jun. 25, 2010, Koch, et al.

* cited by examiner

*Primary Examiner* — Robert Jones, Jr.
(74) *Attorney, Agent, or Firm* — Oblon, Spivak, McClelland, Maier & Neustadt, L.L.P.

(57) ABSTRACT

The invention relates to a dielectric layer with a permittivity of 3.5 or less comprising a dielectric obtainable by polymerizing at least one twin monomer comprising
a) a first monomer unit which comprises a metal or semimetal, and
b) a second monomer unit which is connected to the first monomer unit via a chemical bond,
wherein the polymerization involves polymerizing the twin monomer with breakage of the chemical bond and formation of a first polymer comprising the first monomer unit and of a second polymer comprising the second monomer unit, and wherein the first and the second monomer unit polymerize via a common mechanism.

19 Claims, No Drawings

LOW-K DIELECTRICS OBTAINABLE BY TWIN POLYMERIZATION

The present invention relates to a dielectric layer with a permittivity of 3.5 or less and to a process for producing semiconductor components comprising such layers.

With increasing integration density of integrated circuits (IC), the performance of the interconnects is moving ever more to the forefront. In addition to the conductor materials, the dielectric also plays a crucial role in order to achieve structures below 45 nm. The essential requirement on the dielectric is a minimum relative permittivity ⌴ (also known as dielectric constant), symbolized in the English-speaking world and hereinafter with k. Materials with a permittivity less than 3.7 ($SiO_2$) are generally referred to as low-k dielectrics. The lower limit of the permittivity is that of the vacuum, which is 1.

In order to achieve a low permittivity, the material must be highly porous on the one hand, but also, on the other hand, have sufficiently mechanical stability in order to survive the production process undamaged.

Currently used low-k dielectrics consist of inorganic materials, organic materials or hybrids of inorganic and organic materials. The deposition of dielectrics with a k value of 2.5 or less is currently being carried out by two methods, by the spin-on method or by plasma enhanced chemical vapor deposition (PECVD). A detailed description of the two methods can be found, for example, in Future FAB International 17, Volume 17—Jun. 21, 2004, Section 6, "Low k Dielectrics: Spin-On or CVD?" and in Future FAB International, Volume 23—Jul. 9, 2007, Section 6 "Can Spin-on or CVD Porous Low-k Films Meet Future Integration Needs?".

In spin-on methods, organosilica or organic compounds are applied in liquid form. Four classes of porous low-k dielectrics, which are typically deposited with the aid of the spin-on method, can be distinguished:

silsesquioxane (SSQ)-based materials, which are organic-inorganic polymers of the empirical formula $(R-SiO_{3/2})_n$, silicate-based materials, which are purely of inorganic nature, organic polymers and amorphous carbon.

The porosity can be generated by nanoparticles, or by pore formers (porogens) which are driven out in the course of curing.

The disadvantage of these porous low-k dielectrics deposited by the spin-on method is their poor mechanical properties, such as low Young modulus and pore sizes in the range from 3 to 10 nm, which complicate integration. The low adhesion makes such low-k dielectrics relatively incompatible with chemical mechanical planarization (CMP), and the large pores lead to problems with regard to the integrity of barrier layers, such as so-called pinholes. Finally, the existing low-k dielectrics have a high thermal expansion, which complicates a thermal treatment during the production or test processes.

To improve the mechanical stability of nanoporous silicates, U.S. Pat. No. 6,410,149 B1 proposes mixing a mono-, bi- or trifunctional alkoxysilane with a tetrafunctional alkoxysilane, applying them to the substrate and then crosslinking them to form the nanoporous silicate.

In U.S. Pat. No. 7,148,263 B2, a low-k dielectric is produced by applying a composition comprising a pore former, a solvent, a catalyst and a mixture of two silicon-containing prepolymers to the substrate, crosslinking it and finally heating it in order to drive out the porogen completely.

A disadvantage of the low-k dielectrics available to date is in particular the mechanical stability which is relatively poor in spite of all efforts.

On the other hand, Angew. Chem. 2007, 119, 636-640 describes the cationic twin polymerization of tetrafurfuryloxysilane (TFOS) or difurfuryloxysilane (DFOS), which, in only one step, gives rise to a nanocomposite consisting of interpenetratingly crosslinked polyfurfuryl alcohol (PFA) and silica gel. These $PFA/SiO_2$ nanocomposites are intended as precursors for producing microporous nanostructured carbons. It is also stated that the $PFA/SiO_2$ nanocomposites can be converted to mesoporous $SiO_2$ by thermal oxidation with atmospheric oxygen.

It is an object of the present invention, with respect to the prior art cited above, to provide a low-k dielectric based on $SiO_2$, which has an improved microporosity and improved mechanical stability.

This object is achieved by a dielectric layer with a permittivity of 3.5 or less comprising a dielectric obtainable by polymerizing at least one twin monomer. The at least one twin monomer comprises a) a first monomer unit which comprises a metal or semimetal, and b) a second monomer unit which is connected to the first monomer unit via a chemical bond, wherein the polymerization involves polymerizing the twin monomer with breakage of the chemical bond and formation of a first polymer comprising the first monomer unit and of a second polymer comprising the second monomer unit, and wherein the first and the second monomer unit polymerize via a common mechanism.

When the polymerizations proceed by the same mechanism, two interpenetrating polymeric networks of the first and the second polymer are formed in parallel. It can also be stated that the polymerizations to form the first and the second polymer are kinetically coupled.

By virtue of the solution according to the present invention, nanostructured composites on the length scale from 0.5 nm to 2 nm can be developed for a wide variety of different material classes, where template-assisted methods using organic polymers meet the intrinsic limit. In template-assisted methods, an "auxiliary polymer", for example a hydrophobic/hydrophilic block copolymer, is used, which assumes a particular order and in one block comprises the precursor for the oxide structures.

The polymerization method according to the present invention thus closes the gap in the length scale between molecule and typical nanostructure. When two crosslinked polymer structures form simultaneously, the length scale of the particular component in the composite is determined by the molecule size of the monomer unit and by diffusion processes.

A characteristic feature of the course of twin polymerization is that a first macromolecule comprising M (e.g. $SiO_2$, if appropriate with "defects" as a result of $-O-Si(CH_3)_n$ fractions) forms synchronously with a second polymer. The twin polymerization of specially designed monomers consisting of two different, chemically linked units (hybrid monomers) leads in only one process step to the simultaneous formation of two different polymers. The advantageous bicontinuous structure of inorganic and organic phase of the hybrid material is achieved by the use of an individual reactant from which the two phases form simultaneously. The phases separate during the polymerization, without there being any macroscopically visible precipitation of a reaction product. Instead, the separation occurs on a length scale in the nanometer range. The two phases which form in the polymerization penetrate one another completely and continuously. The formation of isolated domains cannot be observed when the reaction is conducted correctly. This leads to a particularly homogeneous distribution of the phases.

Twin polymerization therefore differs significantly from organic silicate hybrid monomers of already known processes for producing dielectric layers, such as simultaneous polymerization, in which two different monomers are polymerized simultaneously in one system, or consecutive polymerization, where combined monomers (mother monomers) are polymerized in succession by two different mechanisms.

The second monomer unit is connected to the first monomer unit via a chemical bond. In the context of the present invention, a chemical bond is any bond which extends beyond mere electrostatic interaction, such as ion-ion interactions or van der Waals forces. The bond is preferably essentially covalent.

The first monomer unit comprises a metal or semimetal. The metal or semimetal may preferably be Si, B, Ti, Zr or Hf, without being restricted thereto. Particular preference is given to the semimetal Si or the metal Ti.

The first polymer is preferably essentially inorganic. Essentially inorganic means that the organic content is less than 10% by weight, preferably less than 5% by weight. Additionally preferably, the first polymer is a metal oxide or semimetal oxide. The first polymer is more preferably $(SiO_2)_n$.

Preferred essentially inorganic polymers are silicates $[SiO_2]_n$, borates $[B_2O_3]_n$ and titanates $[TiO_2]_n$, without being restricted thereto. The essentially inorganic polymers may have purely covalently bonded structures or else be those which are present (partly) as a crystal lattice.

The second polymer is preferably essentially organic. Essentially organic means that the first polymer consists of a hydrocarbon skeleton in which carbon and also hydrogen may be at least partly substituted and the nonorganic fraction is less than 10% by weight, preferably less than 5% by weight.

More preferably, the first polymer is inorganic and the second polymer is organic.

The stoichiometric ratios between the organic and inorganic part of the hybrid monomer may be varied within wide limits according to the molecular structure. For example, ratios in the range from 1:10 to 10:1 are possible.

With the aid of the dielectric layer according to the present invention, it is possible to achieve permittivities of 3.5 or less, preferably 3.0 or less, further preferably 2.5 or less, more preferably of 2.0 and less. The first polymer and the second polymer may remain in the dielectric layer. When the first polymer is an essentially inorganic polymer and the second polymer is an essentially organic polymer, an inorganic-organic composite arises.

The second polymer can alternatively be removed thermally, oxidatively or thermally and oxidatively. This affords an essentially inorganic dielectric layer with interstices in the nanometer range, which, in spite of very low permittivity, have an outstanding mechanical stability. The removal of the second polymer further lowers the permittivity.

The second monomer unit may preferably be the

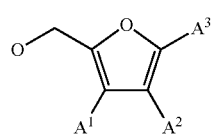

radical in which $A^1$, $A^2$, $A^3$ are each independently hydrogen, linear or branched aliphatic hydrocarbon radicals, aromatic hydrocarbon radicals, or aromatic-aliphatic hydrocarbon radicals.

Additionally preferably, the second monomer unit may be the

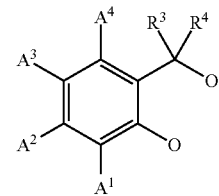

radical where $A^1$, $A^2$, $A^3$ and $A^4$ are each independently hydrogen or linear or branched, aliphatic hydrocarbon radicals, aromatic hydrocarbon radicals or aromatic-aliphatic hydrocarbon radicals, and $R^3$, $R^4$ are each independently hydrogen or an alkyl group having from 1 to 6 carbon atoms, preferably methyl or H.

One example of a twin monomer is an organometallic compound $M(R^1)_n(R^2)_m$. In this case, at least one first polymer comprising M and at least one second polymer comprising the $R^1$ group are formed simultaneously,
where
M is a metal or semimetal, preferably Si, B, Ti, Zr or Hf,
n is an integer from 3 up to the maximum valency V of M
m is an integer from 0 to V-n,
$R^1$ is

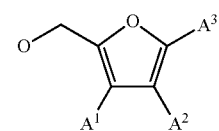

or two $R^1$ radicals together are

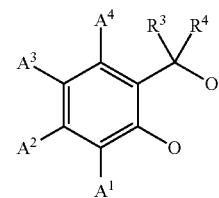

In these structures,
$A^1$, $A^2$, $A^3$, $A^4$ are each independently hydrogen or linear or branched, aliphatic hydrocarbon radicals, aromatic hydrocarbon radicals or aromatic-aliphatic hydrocarbon radicals,
$R^2$ is hydrogen or linear or branched, aliphatic hydrocarbon radicals, aromatic hydrocarbon radicals or aromatic-aliphatic hydrocarbon radicals,
$R^3$, $R^4$ are each independently hydrogen or an alkyl group having from 1 to 6 carbon atoms, preferably methyl or H.

Preferably, the low-k dielectrics are preparable by simultaneously polymerizing hybrid monomers (twin monomers) which have at least three M-O—C bonds. What is crucial here is that two different, macromolecular structures are formed simultaneously in one process. The two polymers which form may each form linear, branched or crosslinked structures. The molecular composition of the hybrid monomer defines the theoretical degree of crosslinking.

The polymerization of the first and of the second monomer unit can generally proceed by any mechanism, provided that the mechanisms are the same. The polymerization preferably proceeds anionically, cationically or free-radically, i.e. the polymerizations of the first and of the second monomer both proceed anionically, cationically or free-radically. Preference is given to a cationic twin polymerization. The growth steps of the two polymers are coupled kinetically, such that the first polymer is formed on the same time scale as the second polymer.

Two preferred types of cationic twin polymerizations are:

In the case of hybrid monomers in which none of the R1 radicals together form a ring system, the cationic polymerization additionally forms a further low molecular weight condensation product, for example water. This reaction is thus a condensation polymerization, also referred to hereinafter as twin polycondensation.

The addition polymerization of one monomer A onto a polymer -[A-]n forms a new bond between the next monomer unit in each case and the active chain end, and a bond within the monomer is broken. The broken bond may be part of a multiple bond (e.g. ethene or styrene) or part of a ring (e.g. caprolactam).

One example of twin polycondensation is the polymerization of tetrafurfuryloxysilane (TFOS) according to the following scheme:

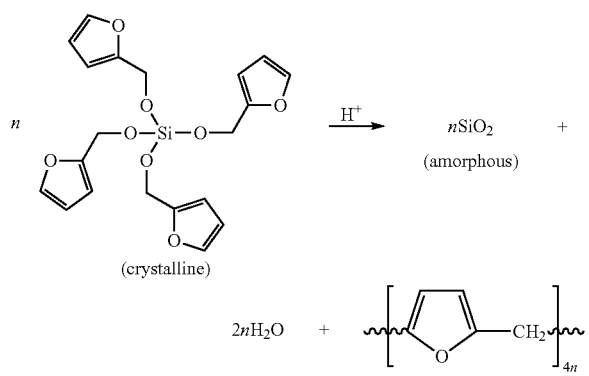

In the case of hybrid monomers in which at least two of the $R^1$ radicals or $R^1$ and $R^2$ radicals together form a ring system, a ring-opening polymerization forms two polymers in one process, without low molecular weight products being eliminated. This is also referred to hereinafter as twin ring-opening polymerization. Silicate monomers with polymerizable groups in the organic radicals (e.g. vinyl groups) afford, as well as $SiO_2$, an organic polymer in one process, without low molecular weight products being formed.

One example of a twin ring-opening polymerization is the polymerization of metal- or semimetal-spiro compound, for example 2,2'-spirobi[4H-1,3,2-benzodioxasiline] according to the scheme:

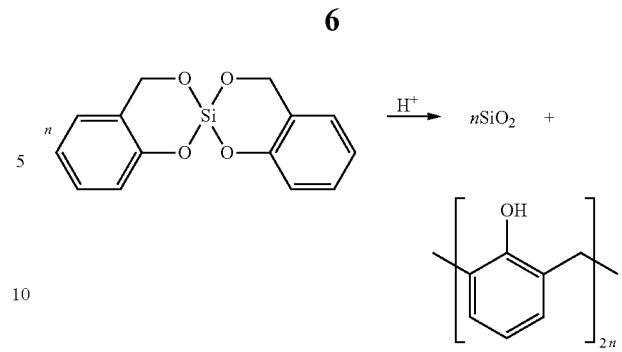

A mixed form of polycondensation and ring-opening polymerization is likewise possible.

The A and B units may equally be joined by one or more bonds, which may be linear or within the ring.

Particularly preferred twin monomers for a twin polycondensation are those of the formula (IIa)

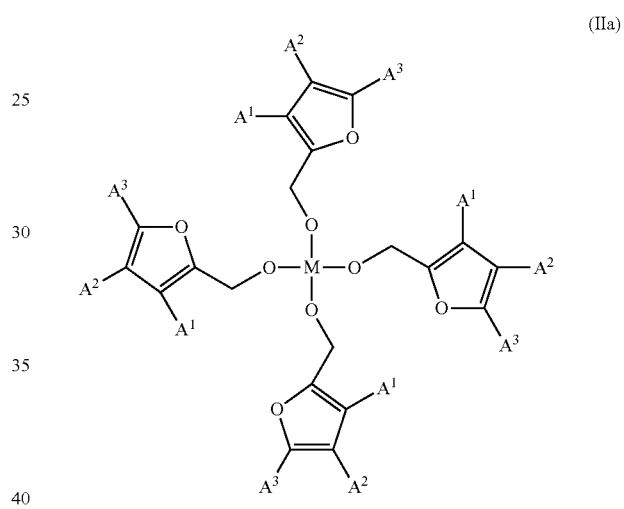

(IIa)

where
M is a metal or semimetal, preferably Si, Ti, Zr or Hf, more preferably Si or Ti,
$A^1$, $A^2$, $A^3$ are each independently hydrogen or linear or branched, aliphatic hydrocarbon radicals, aromatic hydrocarbon radicals or aromatic-aliphatic hydrocarbon radicals.

Preferably, two or more than two of the $A^1$ to $A^3$ radicals are joined to one another, more particularly fused, i.e. joined to form a common ring system.

It is additionally preferred when one or more carbon atoms of the $A^1$ to $A^3$ radicals are independently replaced by heteroatoms, more particularly by oxygen, sulfur and/or nitrogen. It is also preferred when $A^1$ to $A^3$ independently comprise one or more functional groups. Useful functional groups include especially halogen, especially bromine, chlorine, or else —CN and —$NR_2$ where R is especially hydrogen or an aliphatic or aromatic hydrocarbon radical, preferably H, methyl, ethyl or phenyl.

More preferably, at least one of the two $A^1$ and $A^3$ radicals is a hydrogen atom. In a very particularly preferred embodiment, both $A^1$ and $A^3$ are a hydrogen atom. Also very particularly preferably, $A^1$ to $A^3$ are each H.

Most preferred is the compound tetrafurfuryloxysilane.

The twin polycondensation is described as such in detail in Angew. Chem. 2007, 119, 636-640.

Particularly preferred twin monomers for a twin ring-opening polymerization are also spiro compounds of the formula (IIb):

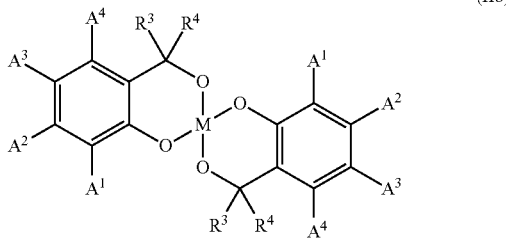

where
M is a metal or semimetal, preferably Si, Ti, Zr or Hf, more preferably Si or Ti,
$A^1, A^2, A^3, A^4$ are each independently hydrogen or linear or branched, aliphatic hydrocarbon radicals, aromatic hydrocarbon radicals or aromatic-aliphatic hydrocarbon radicals,
$R^3, R^4$ are each independently hydrogen or an alkyl group having from 1 to 6 carbon atoms, preferably methyl or H.

The twin ring-opening polymerization of spiro compounds is described in detail as such in German patent application No. 10 2007 063284.5, which was unpublished at the priority date of the present application.

Preferably, two or more than two of the $A^1$ to $A^4$ radicals are joined to one another, more particularly fused, i.e. joined to form a common aromatic ring system.

It is additionally preferred when one or more carbon atoms of the $A^1$ to $A^4$ radicals are independently replaced by heteroatoms, more particularly by oxygen, sulfur and/or nitrogen. It is also preferred when $A^1$ to $A^4$ each independently comprise one or more functional groups. Useful functional groups include especially the following groups: halogen, especially bromine, chlorine or else —CN and —NR$_2$ where R is especially hydrogen or an aliphatic or aromatic hydrocarbon radical, preferably H, methyl, ethyl or phenyl.

Additionally preferably, the $R^1$ and $R^2$ radicals are each independently hydrogen or an alkyl group having from 1 to 6 carbon atoms. $R^1$ and $R^2$ are preferably each selected from hydrogen (H) and methyl. More preferably, $R^1$ and $R^2$ are each H.

More preferably, at least one of the two $A^1$ and $A^3$ radicals is a hydrogen atom. In a very particularly preferred embodiment, both $A^1$ and $A^3$ are a hydrogen atom. Also very particularly preferably, $A^1$ to $A^4$ are each H.

Most preferred is the compound 2,2'-spirobi[4H-1,3,2-benzodioxasiline].

The present invention further provides for the use of a composition comprising at least one twin monomer comprising
a) a first monomer unit which comprises a metal or semimetal, and
b) a second monomer unit which is connected to the first monomer unit via a chemical bond,
for producing dielectric layers with a permittivity of 3.5 on semiconductor substrates, the twin monomer being polymerizable with breakage of the chemical bond and formation of a first polymer comprising the first monomer unit and of a second polymer comprising the second monomer unit, and the first and the second monomer unit being polymerizable via a common mechanism.

The dielectric layers according to the present invention may, as well as the dielectrics obtainable by twin polymerization, comprise further additives and auxiliaries. It is preferred that the dielectric layer consists essentially of the dielectric obtainable by twin polymerization, i.e. only small amounts of other substances below 5% by weight are present.

The dielectric layers according to the present invention are suitable especially for producing dielectric layers in the BEOL and FEOL sector in semiconductor units, especially in copper metallization to produce logic and memory components, (e.g. DRAM, NAND flash, etc.). In such high-performance semiconductor units with increasingly smaller distances between the metal tracks, the inventive dielectric layers constitute high-value insulator layers which effectively suppress parasitic coupling capacitances and hence enable high current densities and switching speeds.

The layer thicknesses of the layers range from 500 nm to 2 μm, preferably from 300 nm to 600 nm, more preferably from 100 nm to 200 nm.

The dielectric layers with a permittivity of less than 3.5 can preferably be applied by a process in which:
a) at least one twin monomer comprising a first monomer unit which comprises a metal or semimetal, and a second monomer unit which is connected to the first monomer unit via a chemical bond, is applied to a semiconductor substrate, and
b) the at least one organometallic compound is polymerized with breakage of the chemical bond and formation of a first polymer comprising the first monomer unit and of a second polymer comprising the second monomer unit, and wherein the first and the second monomer unit polymerize by the same mechanism.

The twin monomer(s) can be applied in step a) with the aid of all known methods, especially by the spin-on method.

In the spin-on method (spin-coating method), a dilute solution of the polymers is applied as a thin layer while rotating the substrate (semiconductor component). Through dilution, viscosity and rotation speed, the desired layer thickness can be established. Owing to the high rotation speeds, a portion of the solvent/solvent mixture is volatilized as early as in the course of spin-coating. In a subsequent heating step or in a sequence of heating steps (prebake and hotbake) in different temperature ranges (100-200° C.; 200-300° C.; 300-400° C.; but at most 450° C.), the material is polymerized and cured. Temperatures around 350-450° C. serve to increase the porosity by thermolysis of the organic porogens and hence to reduce the dielectric constant. Particular preference is given to a temperature range of 400-450° C. to produce the low-k dielectrics.

The twin polymer can either be used as such, or step b) can be followed by a step c) in which the second polymer is removed thermally and/or oxidatively to form a nanostructured porous metal oxide or semimetal oxide. Suitable selection of the twin polymer and of the temperature of the heat treatment steps employed after the spin-coating process allows the mechanical and physical properties of the deposited low-k dielectrics to be adjusted in a controlled manner. To prevent degradation and/or precipitation later in the manufacturing process or in the course of functional use, heat treatment steps at high temperature are advantageous. Preferred temperatures 300° C. particularly preferred temperatures 400-450° C.

In addition to the catalysts mentioned, the polymerization can also be started by cationic photoinitiators. Cationic photoinitiators are known and are used, for example, to cure epoxy resins. Typical cationic photoinitiators are onium salts, ferrocenium salts or diazonium salts. Preferred onium salts are selected from sulfonium and iodonium salts, for example triarylsulfonium salts or diaryliodonium salts. The counterions of the onium salts, ferrocenium salts or diazonium salts are non-nucleophilic anions, such as tetrafluoroborate, tetrakis(pentafluorophenyl)borate, hexafluorophosphate or hexafluoroantimonate.

When illuminated, the onium salts lead to the formation of superacids which catalyze the ring-opening of the polyisobutene epoxide. The illumination can be effected by means of UV light, visible light, electron beams or gamma radiation. With regard to the conditions, suitable conditions are generally those which are used in the cationic polymerization of epoxy resins.

All documents cited are incorporated in the present patent application by reference. All statements of proportions (percentages, ppm, etc.) are based on the weight, based on the total weight of the mixture, unless stated otherwise.

The invention claimed is:

1. A solid dielectric layer with a permittivity of 3.5 or less comprising a solid dielectric obtained by a process comprising polymerizing at least one twin monomer comprising
    a) a first monomer unit which comprises a metal or semimetal, and
    b) a second monomer unit which is connected to the first monomer unit via a chemical bond,
    wherein the polymerization involves polymerizing the twin monomer with breakage of the chemical bond and formation of a first polymer comprising the first monomer unit and of a second polymer comprising the second monomer unit, and wherein the first and the second monomer unit polymerize via a common mechanism.

2. The solid dielectric layer according to claim 1, wherein the metal or semimetal is Si, B, Ti, Zr or Hf.

3. The solid dielectric layer according to claim 1, wherein the first polymer is essentially inorganic and the second polymer is essentially organic.

4. The solid dielectric layer according to claim 1, wherein the first monomer unit and the second monomer unit polymerize anionically, cationically or free-radically.

5. The solid dielectric layer according to claim 1, wherein the permittivity is 3.0 or less.

6. The solid dielectric layer according to claim 1, wherein the second polymer is removed thermally, oxidatively or thermally and oxidatively.

7. The solid dielectric layer according to claim 1, wherein the second monomer unit is a

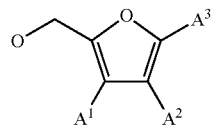

radical in which $A^1$, $A^2$, $A^3$ are each independently hydrogen, linear or branched aliphatic hydrocarbon radicals, aromatic hydrocarbon radicals, or aromatic-aliphatic hydrocarbon radicals.

8. The solid dielectric layer according to claim 1, wherein the second monomer unit is a

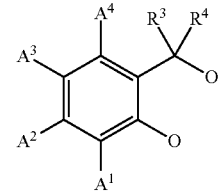

radical where $A^1$, $A^2$, $A^3$ and $A^4$ are each independently hydrogen or linear or branched, aliphatic hydrocarbon radicals, aromatic hydrocarbon radicals or aromatic-aliphatic hydrocarbon radicals, and $R^3$, $R^4$ are each independently hydrogen or an alkyl group having from 1 to 6 carbon atoms.

9. The solid dielectric layer according to claim 7, wherein at least two of the $A^1$, $A^2$, $A^3$ and, where present, $A^4$ radicals are joined to one another.

10. The solid dielectric layer according to claim 7, wherein one or more carbon atoms of the $A^1$, $A^2$, $A^3$ and, where present, $A^4$ radicals are independently replaced by heteroatoms.

11. The solid dielectric layer according to claim 7, wherein $A^1$, $A^2$, $A^3$ and, where present, $A^4$ are each independently one or more functional groups, selected from the group consisting of a halogen, CN and NR2, wherein in NR2 R is H, an aliphatic hydrocarbon, or an aromatic hydrocarbon.

12. The solid k dielectric layer according to claim 7, wherein $A^1$ and $A^3$ are each H.

13. The solid dielectric layer according to claim 1, wherein the solid dielectric is obtained by a process comprising twin polymerizing at least one organosilicon compound represented by formula (IIa)

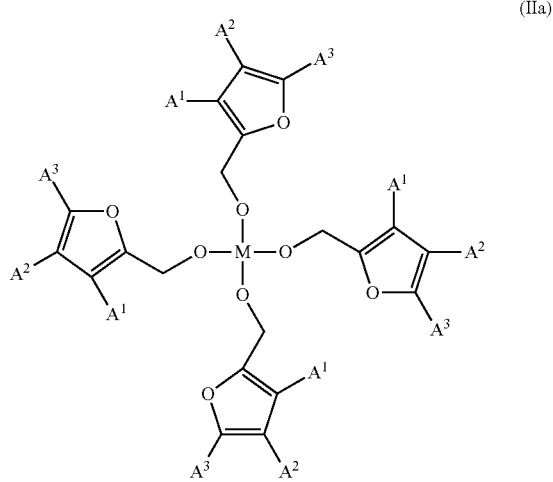

where
M is a metal or semimetal selected from the group consisting of Si, Ti, Zr and Hf,
$A^1$, $A^2$, $A^3$ are each independently hydrogen or linear or branched, aliphatic hydrocarbon radicals, aromatic hydrocarbon radicals or aromatic-aliphatic hydrocarbon radicals.

14. The solid dielectric layer according to claim 1, wherein the dielectric is obtained by a process comprising twin polymerizing at least one organosilicon compound of the formula (IIb)

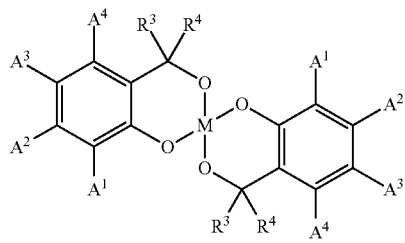

where
M is a metal or semimetal, selected from the group consisting of Si, Ti, Zr and Hf,
$A^1, A^2, A^3, A^4$ are each independently hydrogen or linear or branched, aliphatic hydrocarbon radicals, aromatic hydrocarbon radicals or aromatic-aliphatic hydrocarbon radicals,
$R^3, R^4$ are each independently hydrogen or an alkyl group having from 1 to 6 carbon atoms.

15. A semiconductor component comprising a solid dielectric layer according to claim 1.

16. A process for producing semiconductor components comprising at least one solid dielectric layer according to claim 1, said process comprising polymerizing at least one twin monomer comprising
    a) a first monomer unit which comprises a metal or semimetal, and
    b) a second monomer unit which is connected to the first monomer unit via a chemical bond,
    wherein the polymerization involves polymerizing the twin monomer
    with breakage of the chemical bond and formation of a first polymer comprising the first monomer unit and of a second polymer comprising the second monomer unit, and wherein the first and the second monomer unit polymerize via a common mechanism.

17. The solid dielectric layer according to claim 10, wherein the heteroatom is selected from the group consisting of O, S and N.

18. The dielectric layer of claim 11, wherein the halogen is Br or Cl.

19. The solid dielectric layer according to claim 11, wherein R is H, methyl, ethyl, or phenyl.

* * * * *